Oct. 31, 1933.  R. W. RIGLER  1,932,482
OPHTHALMIC TEST FRAME
Filed Nov. 8, 1930
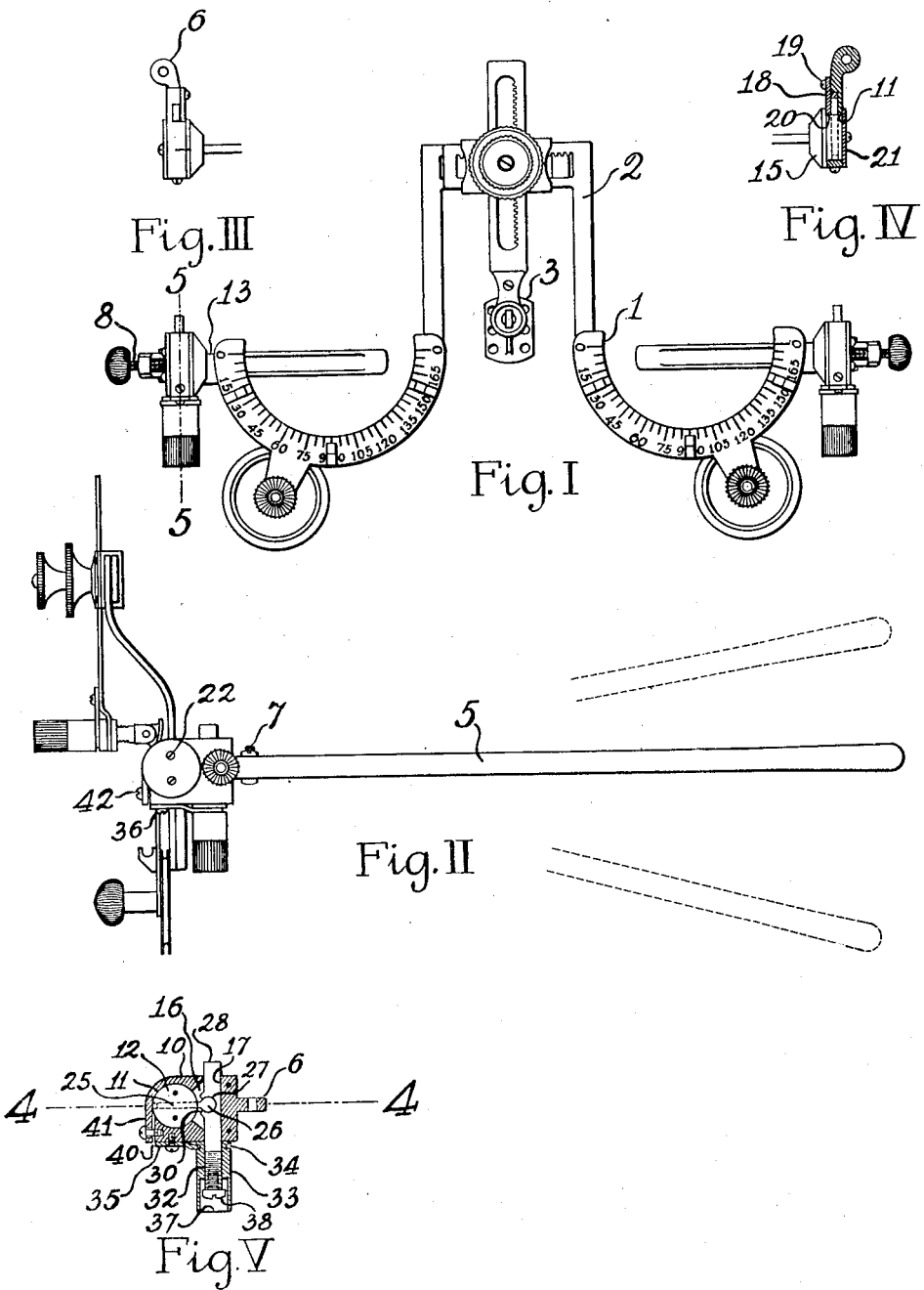
INVENTOR.
Richard W. Rigler
BY
Cyrus N. Anderson
ATTORNEY Patented Oct. 31, 1933

1,932,482

UNITED STATES PATENT OFFICE 1,932,482

OPHTHALMIC TEST FRAME

Richard W. Rigler, Philadelphia, Pa., assignor to Wall & Ochs, Incorporated, Philadelphia, Pa., a corporation of Pennsylvania Application November 8, 1930. Serial No. 494,259

7 Claims. (Cl. 88—20)

My invention relates to ophthalmic test or trial frames which are adapted for use in the examination of eyes for the purpose of testing or trying out lenses. The invention relates more particularly to an improvement in the means for effecting angular adjustment between the temples and the frame of the device.

The general object of the invention is to provide a construction of novel character by which the angular adjustment between the temples and the frame may be effected with greater accuracy than heretofore has been practical, as far as I am aware.

It also is an object of the invention to provide a novel means of a character such that when an adjustment has been effected there is no likelihood of accidental change or variation in the relationship established by such adjustment.

To the foregoing and other ends my invention comprehends the construction and arrangement of parts as hereinafter described in detail, particularly pointed out in the appended claims and as illustrated in the drawing accompanying the specification and forming a part thereof wherein I have illustrated an embodiment of the invention in the form which at present is preferred by me. However, it will be understood that the invention is susceptible of embodiment in other forms of construction than that disclosed and that changes in the details of construction may be made within the scope of the claims without departing from the said invention or the principle thereof.

In the drawing:

Fig. 1 is a view in front elevation of an ophthalmic frame for testing lenses provided with means embodying the invention;

Fig. 2 is a view in side elevation;

Fig. 3 is a view in top plan of one end portion of the frame within which is embodied my invention;

Fig. 4 is a view in horizontal section taken on the dash and dot line 4—4 of Fig. 5; and Fig. 5 is a view in transverse vertical section taken on the dash and dot line 5—5 of Fig. 1.

In the drawing I have shown a test or trial frame having lens holding portions 1 and a connecting bridge portion 2 upon the central part of which is adjustably mounted a member 3 which is adapted to rest upon the nose of the party whose eyes are being tested. Temples 5 of any preferred known construction are pivotally connected at their forward ends to temple lugs 6 by means of pivots 7. For the purpose of controlling the extent to which the rear end portions of the temples may be moved away from each other, I have provided adjustable contacts consisting of screws 8, the inner ends of which are adapted to contact with the outer sides of the structure including the means for effecting angular vertical adjustment between the temples and the frame, which means embodies the invention.

One of these structures is located at each end of the frame and as they are in all respects identical the remaining portion of the description will be directed to a single one of the said structures.

The temple lug 6 is connected, in the construction illustrated, integrally with what may be termed a socket member 10 having a circular opening 11 through which extends the cylindrical outer end portion 12 of a projection 13 which extends outwardly from the outer end of a lens carrying portion 1. The said projection is provided intermedate its ends with an enlarged portion 15 which provides a shoulder at the inner end of the cylindrical portion 12. The member 10 is provided with an opening 16 which extends rearwardly from the circular opening 11 and is flared as shown in Fig. 5. The opening 16 is provided by cutting away a portion of the inner side of the member 10 as shown in Fig. 4. At its rear end the opening 16 terminates in a portion which opens upon the top and bottom edges of the socket member 10. For the purpose of closing the open side of the opening 16 and to form a closed vertical opening 17, I provide a cover plate 18 which is secured by means of fastening screws 19 to the inner side of said member. The rear portion of the said plate is provided with a circular opening as indicated at 20 which engages the inner portion of the cylindrical portion 12 in adjoining relation to the shoulder provided by the part 15. For the purpose of retaining the socket member 10 and the plate 18 in position upon the cylindrical portion 12 of the projection 13, I have provided a circular plate 21 which is secured by means of fastening screws 22 to the outer end of the cylindrical projection. For the purpose of effecting relative rotation of the members 10 and 12, I have provided a pin 25 which extends diametrically through the cylindrical projecting portion 12. The outer rear end of the said pin is provided with a head 26 which is circular in cross section and which is located in a similarly shaped opening 27 provided in a bar 28 movably supported in the opening 17. The opening 27 communicates with the front side of the bar 28 through an opening 30 through which the pin 25 extends. The outer edges of the lips of the opening 30 are flared as shown so as to permit a change in the angular relation between the bar 28 and the pin 25. For the purpose of effecting lengthwise adjustment of the bar 28 in the opening 17, I have provided upon the lower end thereof, which projects downwardly from the member 10, a screw-threaded portion 32 with which is in engagement a screw-threaded sleeve-like member 33 which is provided in adjoining relation to its upper end with a circular groove 34 with which is engaged the rear end of a retaining bar or pin 35, which is secured by means of a fastening screw 36 to the lower side or edge of the socket member 10. The engagement of the rear end of the retaining member 35 in the groove 34 permits rotation of the member 33 but prevents lengthwise or axial movement thereof. It follows that upon rotation of the sleeve-like member 33 lengthwise adjustments of the bar 28 are effected in one direction or the other depending upon the direction or rotation of the said member 33. The member 33 is provided in its lower end with an enlarged opening 37 within which is located the head 38 of a screw which is in engagement with a central screw-threaded opening in the lower end of the bar 28. The head 38 constitutes a stop for limiting the extent of the upward adjustment of the bar 28.

For the purpose of permitting relatively rotatable adjustments between the member 10 and the cylindrical projection 12 and also for the purpose of fastening the two parts together in any position to which they may be adjusted relatively to each other, I have provided a slot 40 in the member 10 which extends from the lower edge upwardly therein in adjoining relation to the front end thereof. The presence of the said slot provides a tongue 41 which may be adjusted toward and from the main body portion of the member 10 by means of a binding screw 42. By adjusting the binding screw 42 the gripping action of the member 10 upon the cylindrical portion 12 may be varied to thereby vary the friction between these two parts.

The projection 13 at each end of the frame which terminates at its outer end in the cylindrical part 12 is rigidly connected with the lens supporting frame part of the structure, from which it follows that upon the rotative adjustment of the parts 10 and 12 relatively to each other the angular relation between the temple bars 5, which are mounted upon the parts 10, and the frame, comprising the parts 1 and 2, is altered. By altering the angular relation of the horizontal plane of the temple bars and the plane of the lens supporting frame, the angular relation of the lenses supported in the lens holding parts 1 of the frame to the eyes which are being tested will be varied.

In the testing of eyes it is desirable that accurate adjustment of the angular relation between the horizontal plane of the temple bars and the lens frame may be effected in order that the best results may be obtained; and also it is desirable that when the desired adjustment has been obtained the parts shall retain the relative positions to which they have been adjusted. It also is desirable that the relative adjustments desired may be effected with ease and readiness by the person who may be using or employing the device and such adjustment may be most readily and easily effected by the turning of the sleeve-like parts 33 previously referred to herein.

The device of my invention provides means whereby all of these desirable results may be obtained.

Having thus described my invention, what I claim and desire to secure by Letters Patent is:

1. In means for effecting angular adjustments between the lens holding frame and the temple bars of an ophthalmic test frame, the combination of cylindrical projections extending outwardly from the opposite ends of said frame, socket members rotatably mounted on said projections, the said socket members each having an opening extending therethrough adjacent said cylindrical projection, a lengthwise adjustable bar extending through each of said openings, and connections between each of said bars and the said projections.

2. In means for effecting angular adjustments between the lens holding frame and the temple bars of an ophthalmic test frame, the combination of cylindrical projections extending outwardly from the opposite ends of the said frame, socket members each of which is provided with a circular opening therethrough within which the said projections are located, the said socket members each having a flared opening extending rearwardly from the said circular openings, the rear end of said flared opening terminating in a portion which opens upon the opposite edge portions of the said socket member, bars located in the rear end portions of the said flared openings, pivotal connections between the said bars and the said cylindrical projections, and means for effecting lengthwise adjustments of the said bars for causing relative rotative movement between the said socket members and the said projections.

3. In means for effecting angular adjustments between the lens holding frame and the temple bars of an ophthalmic test frame, the combination of a projection from an end of the said frame, a member having an opening therethrough within which the said projection is located, said member also having a flared opening which extends from the first named opening rearwardly, the rear end of said flared opening terminating in an opening which extends through the said member from top to bottom thereof, a bar located in the last named opening one end of which projects beyond the said member, a pivotal connection between the said projection and the said bar, and means having connection with the projecting end portion of the said bar for causing lengthwise adjustment of the latter, the said means being permitted to rotate but held against axial movement.

4. In means for effecting angular adjustments between the lens holding frame and the temple bars of an ophthalmic test frame, the combination of a cylindrical projection extending from one end of the said frame, a member having a circular opening within which the said projection is located, means for retaining the said member upon the said projection, the said member having a flared opening extending from the circular opening therein toward the rear, the rear end of the said opening terminating in an opening which extends through the said member from top to bottom thereof, a bar slidably mounted in the rear end of said flared opening, a pivotal connection between the said bar and the said cylindrical projection, a sleeve having screw-threaded connection with one end of the said bar, the said sleeve being rotatable to cause lengthwise adjustments of the said bar, and means for holding the said sleeve against lengthwise movement but permitting it to be rotated.

5. In means for effecting angular adjustments between the lens holding frame and the temple bars of an ophthalmic test frame, the combination of a cylindrical projection extending outwardly from an end of said frame, a member having a circular opening therein within which the said cylindrical member is located, adjustable means for clamping the said member upon the said cylindrical projection for holding the said member and cylindrical projection in desired fixed relation with respect to each other, the said member having a flared opening extending from the said circular opening rearwardly and terminating at its rear end in an opening extending through the said member from top to bottom thereof, a bar slidably mounted in the said last named opening, said bar having a socket in its front side, a pin mounted in an opening provided in said projection and extending diametrically thereof, said pin having upon its projecting end a head which is in engagement with the socket in the said bar, and means for effecting lengthwise adjustment of the said bar to thereby cause relative rotative adjustment of the said member and the said cylindrical projection.

6. In means for effecting angular adjustments between the lens holding frame and the temple bars of an ophthalmic test frame, the combination of cylindrical projections at the opposite ends of the said frame, socket members adjustably mounted upon the said projections, said socket members having vertical openings extending therethrough, means for clamping said socket members upon the said projections, bars mounted in said openings, one end of each of which projects beyond the socket member upon which it is mounted, pivotal connections between the said bars and the said projections, sleeves having screw-threaded engagements with the projecting ends of said bars, one end of each of said sleeves being seated against an edge of the member with which it is associated, said sleeves respectively having circular grooves therein and devices mounted upon the said members which engage the said grooves for holding the said sleeves against axial movement but permitting them to have rotative movement.

7. In means for effecting angular adjustments between the lens holding frame and the temple bars of an ophthalmic test frame, the combination of cylindrical projections extending outwardly from the opposite ends of the said frame, members mounted upon the said projections, said members having circular openings within which the said projections are located and the said members having temple lugs thereon, each of the said members having flared openings which extend from the said circular openings, the rear opposite edges of the said flared openings terminating in the top and bottom edges of the said members, means for clamping the said members upon the said projections, bars slidably mounted in the rear end portions of the said flared openings, said bars extending through the said members, pivotal connections between the said bars and the said cylindrical projections, means for causing lengthwise adjustments of the said bars to cause relative rotative adjustment between the said members and the said cylindrical projections, and means for limiting the lengthwise adjustments of the said bars in one direction.

RICHARD W. RIGLER.